United States Patent [19]

Brearley et al.

[11] Patent Number: 5,004,299
[45] Date of Patent: Apr. 2, 1991

[54] ELECTRONIC BRAKING SYSTEM

[75] Inventors: Malcolm Brearley, Solihull; Richard B. Moseley, Leamington Spa, both of England

[73] Assignee: Lucas Industries public limited company, Birmingham, England

[21] Appl. No.: 487,901

[22] Filed: Mar. 6, 1990

[30] Foreign Application Priority Data

Mar. 8, 1989 [GB] United Kingdom ............... 8905311

[51] Int. Cl.$^5$ .......................... B60T 8/88; B60T 8/32
[52] U.S. Cl. .................................. 303/15; 303/92; 303/100; 303/111; 303/118; 303/119; 303/DIG. 4
[58] Field of Search ............... 303/92, 100, DIG. 4, 303/15-18, 20, 28, 40, 118, 119, DIG. 3, 111, 6.01, 7-8, 9.61, 9.63, 86; 188/181 C

[56] References Cited

U.S. PATENT DOCUMENTS

| | | | |
|---|---|---|---|
| 4,175,795 | 11/1979 | Mortimer et al. | 303/118 |
| 4,708,225 | 11/1987 | Feldman et al. | 303/DIG. 4 |
| 4,712,839 | 12/1987 | Brearley et al. | 303/15 X |
| 4,743,072 | 5/1988 | Brearley | 303/15 |
| 4,784,444 | 11/1988 | McCann et al. | 303/118 |
| 4,795,219 | 1/1989 | Brearly et al. | 300/100 X |
| 4,861,115 | 8/1989 | Petersen | 303/28 X |
| 4,933,854 | 6/1990 | Miyake | 303/111 X |

Primary Examiner—Douglas C. Butler
Attorney, Agent, or Firm—Scrivener and Clarke

[57] ABSTRACT

A vehicle dual wheel braking system of the type in which a respective electronically controlled pressure adjustment channel is provided for each of the wheels at the opposite ends of an axle of the vehicle for setting the braking pressures individually for each wheel in dependence upon a common electrical signal representative of the braking demand level set by a driver of the vehicle, each channel comprising a pressure control loop containing a pressure controller, a pressure control valve which adjusts the supply of fluid from a reservoir to the brake actuators for applying and releasing the brakes by solenoid control of the inlet and exhaust functions of the pressure control valve, and a feedback transducer which supplies a signal representative of the pressure in the pressure control valve. The system includes respective fault monitoring device for detecting the presence of faults in the signals provided by the two feedback transducers, and a device responsive to the fault monitoring device such that if a feedback signal fault is detected in one of the two channels, the individual pressure control on that channel is disabled and the solenoids controlling inlet and exhaust functions of the pressure control valve of that channel are energized from an alternative mechanism of control which does not rely upon the output signal from the faulty feedback transducer.

15 Claims, 10 Drawing Sheets

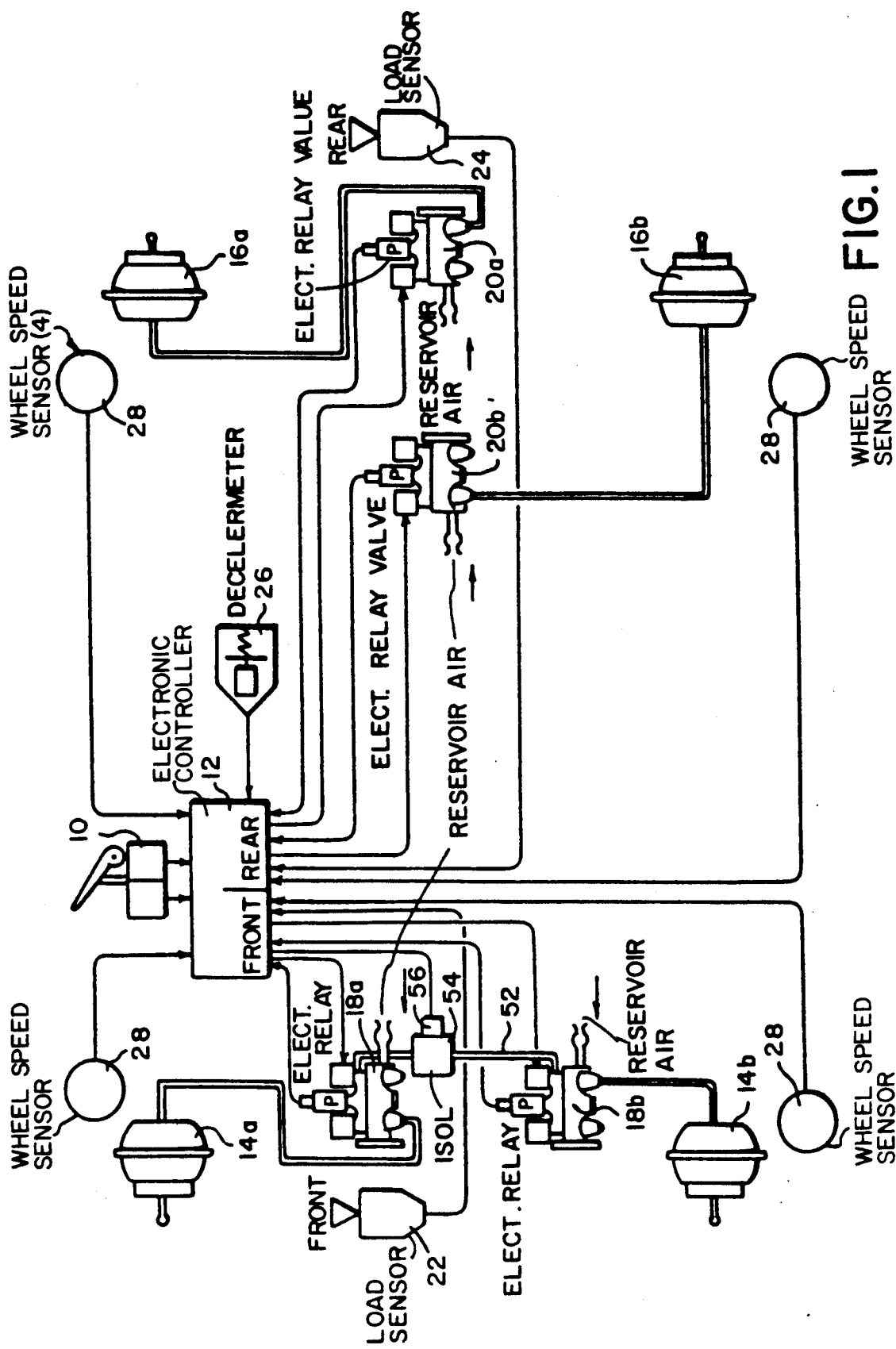

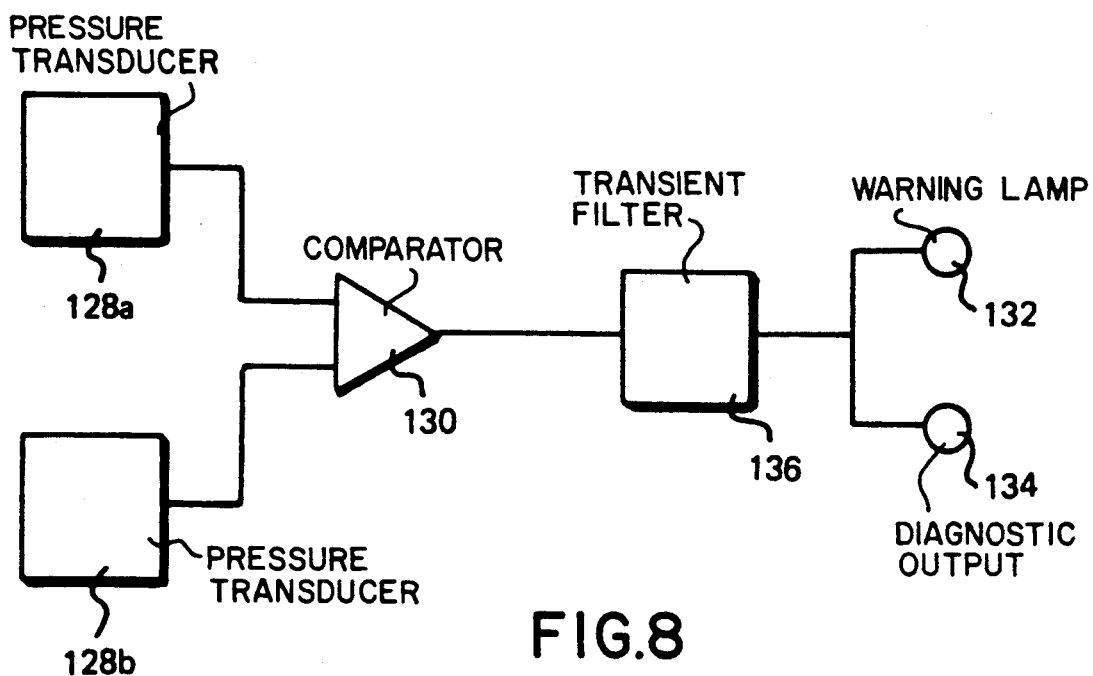
FIG.8
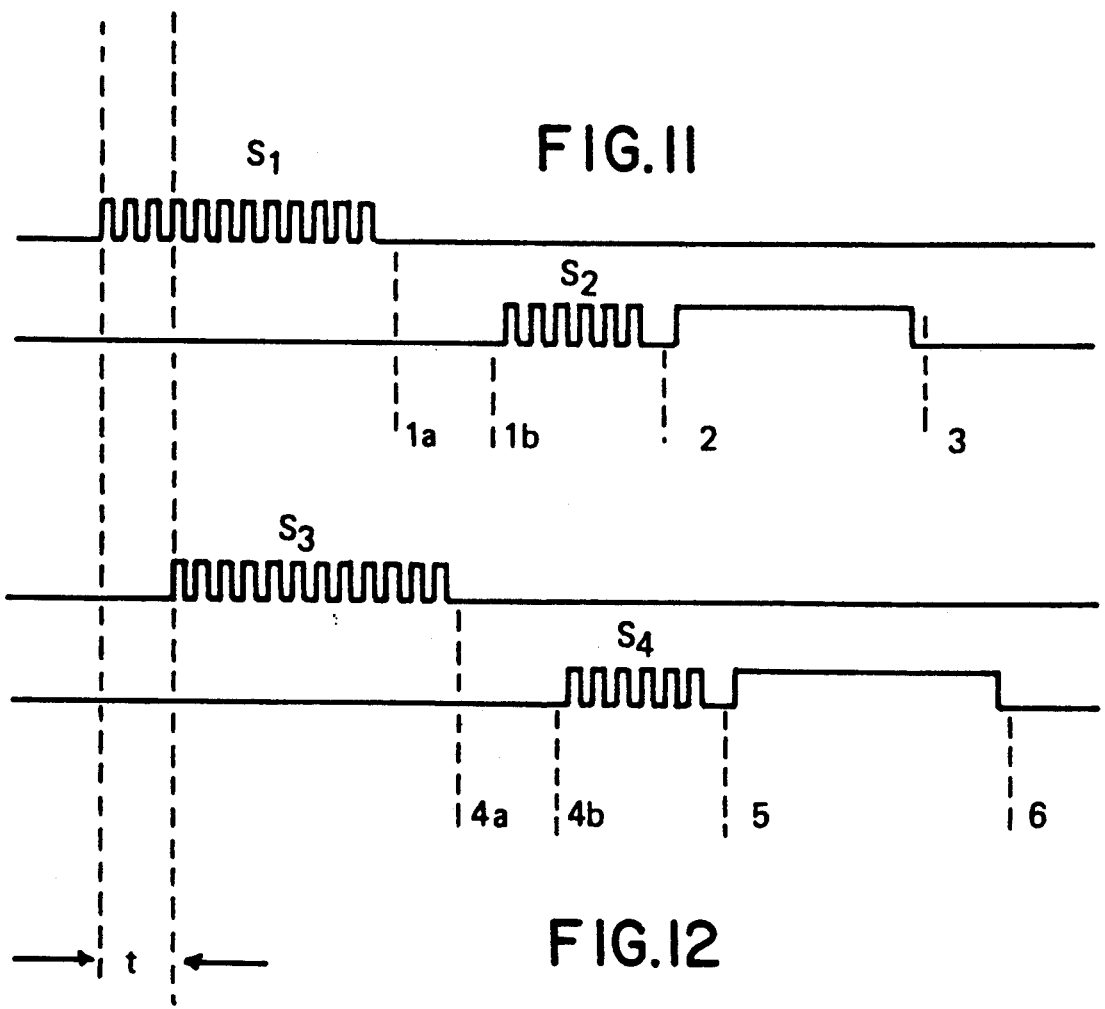
FIG.11
FIG.12

ELECTRONIC BRAKING SYSTEM

The present invention relates to electronic braking systems (EBS) for wheeled vehicles and is concerned in particular with the monitoring of the pressure control means in such systems.

In an electronic braking system (EBS) typically as described in our European Patent Applications Nos. 86303997.0 and 86303998.8 there is provided a braking pressure control means which is itself controlled electronically in relationship to the driver's braking demand (established normally by a foot-operated transducer) to set the braking pressures individually for each axle of the vehicle or, in cases where anti-lock control is to be incorporated, individually for each wheel or on the largest vehicles, some combination of these control levels. The EBS sets and controls braking pressures in response to the driver's demands by the use of pressure control loops.

An object of the present invention is to provide a means of co-ordinate monitoring of the pressure control loops in order than any fault can be detected in order to facilitate the adoption of corrective or compensating action wherever possible.

According to the present invention there is provided a vehicle dual wheel braking system in which a respective electronically controlled pressure adjustment channel is provided for each of the wheels at the opposite ends of an axle of the vehicle for setting the braking pressures individually for each wheel in dependence upon a common electrical signal representative of the braking demand level set by a driver of the vehicle, each channel comprising a pressure control loop containing a pressure controller, a pressure control valve which adjusts the supply of fluid from a reservoir to the brake actuators for applying and releasing the brakes by solenoid control of the inlet and exhaust functions of the pressure control valve, and a feedback transducer which supplies a signal representative of the pressure in the pressure control valve, characterised by respective fault monitoring means for detecting the presence of fault in the signals provided by the two feedback transducers, and means responsive to said fault monitoring means such that if a feedback signal fault is detected in one of said two channels, the individual pressure control on that channel is disabled and the solenoid controlling inlet and exhaust functions of the pressure control valve of that channel are energised from an alternative mechanism of control which does not rely upon the output signal from the faulty feedback transducer.

In a preferred embodiment, the pressure control valves are in the form of solenoid controlled relay valves.

The invention is described further hereinafter, by way of example only, with reference to the accompanying drawings, in which:

FIG. 1 is a diagramatic representation of one embodiment of an EBS incorporating a means for avoiding serious brake unbalance under fault conditions;

FIG. 8 is a circuit diagram of another part of a system embodying the invention;

FIGS. 11 and 12 are pulse diagrams illustrating the application of brake test pulses.

Figure 2A:
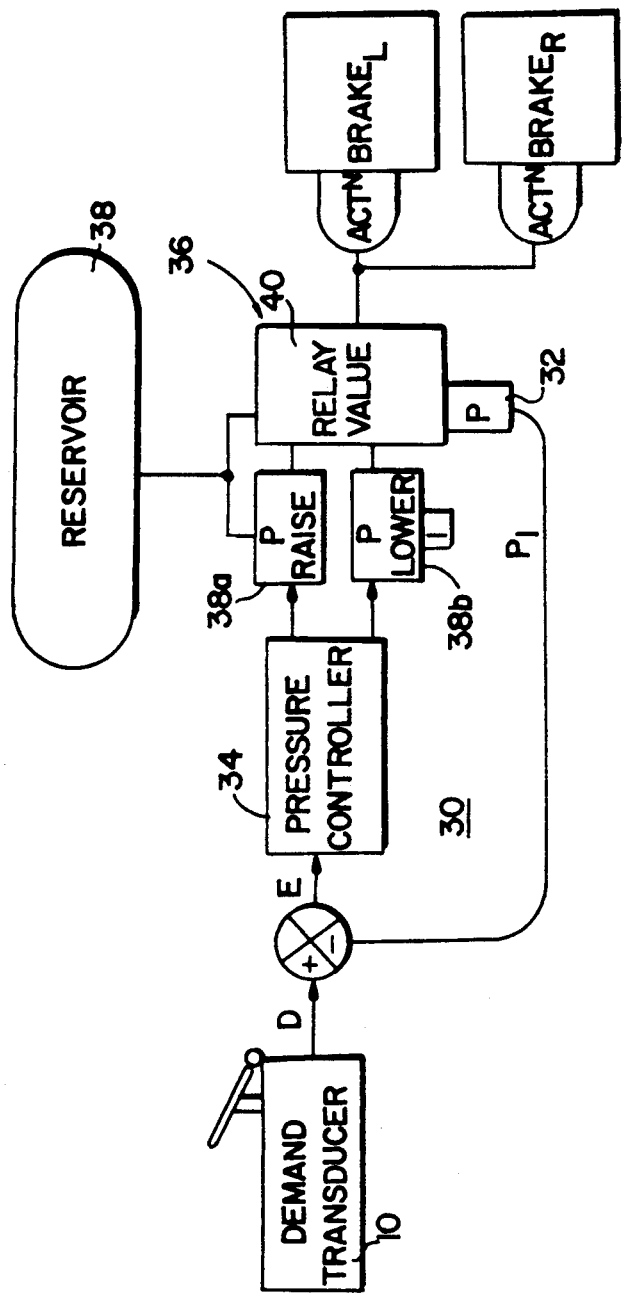
FIG. 2a shows a typical pressure control loop.

FIG. 1 illustrates, inter alia, the main components of a conventional electronic braking system (EBS) which is not described in detail herein. Driver's braking demand signals are generated electrically by a treadle-operated transducer arrangement 10 and supplied to an electronic controller 12 whose front and rear braking pressures are established and fed to left and right front 14a,14b, and left and right rear 16a,16b brake actuators via front relay valves 18a, 18b and rear relay valves 20a, 20b. The braking pressures depend upon operating parameters of the vehicle determined, inter alia, by front and rear load sensors 22,24, a vehicle decelerometer 26 and wheel speed sensors 28.

The EBS sets and controls braking pressures in response to drivers demands by the use of pressure control loops, one example of which is shown in FIG. 2a. This figure shows a typical pressure control loop 30 taking an electrical input signal D from the brake pedal transducer 10 which is used to provide a pressure error signal E by comparison with the output signal $P_1$ of a pressure transducer 32, this pressure error E forming the input to a computer based pressure controller 34 which generates an output signal causing the pressure developed by an electro-pneumatic or electrohydraulic converter 36 to change in a direction such as to reduce the amplitude of the pressure error E. The converter 36 is supplied by a pneumatic or hydraulic reservoir 38, as appropriate.

The nature and circuit of the pressure controller 34 depends upon the type of converter 36 employed. Two principal converter principles are well known, namely the analogue system in which a valve is employed with pressure output developed proportional to solenoid current and a digital system, as shown in FIG. 2a, in which a pair of simpler solenoid valves 38a,38b is employed to raise or lower a control chamber pressure by selective energisation of these valves 38a,38b. A preferred form of pneumatic converter employs a local relay valve 40 which responds to this control chamber pressure and which re-balances into the closed condition when the brake pressures at the brake actuators 42a,42b for left and right hand brakes 44a,44b become equal to said control pressure. Such a valve has an advantage in that the control chamber pressure responds rapidly to valve opening, giving a fast control loop which is accurate and responsive.

Figure 2B:
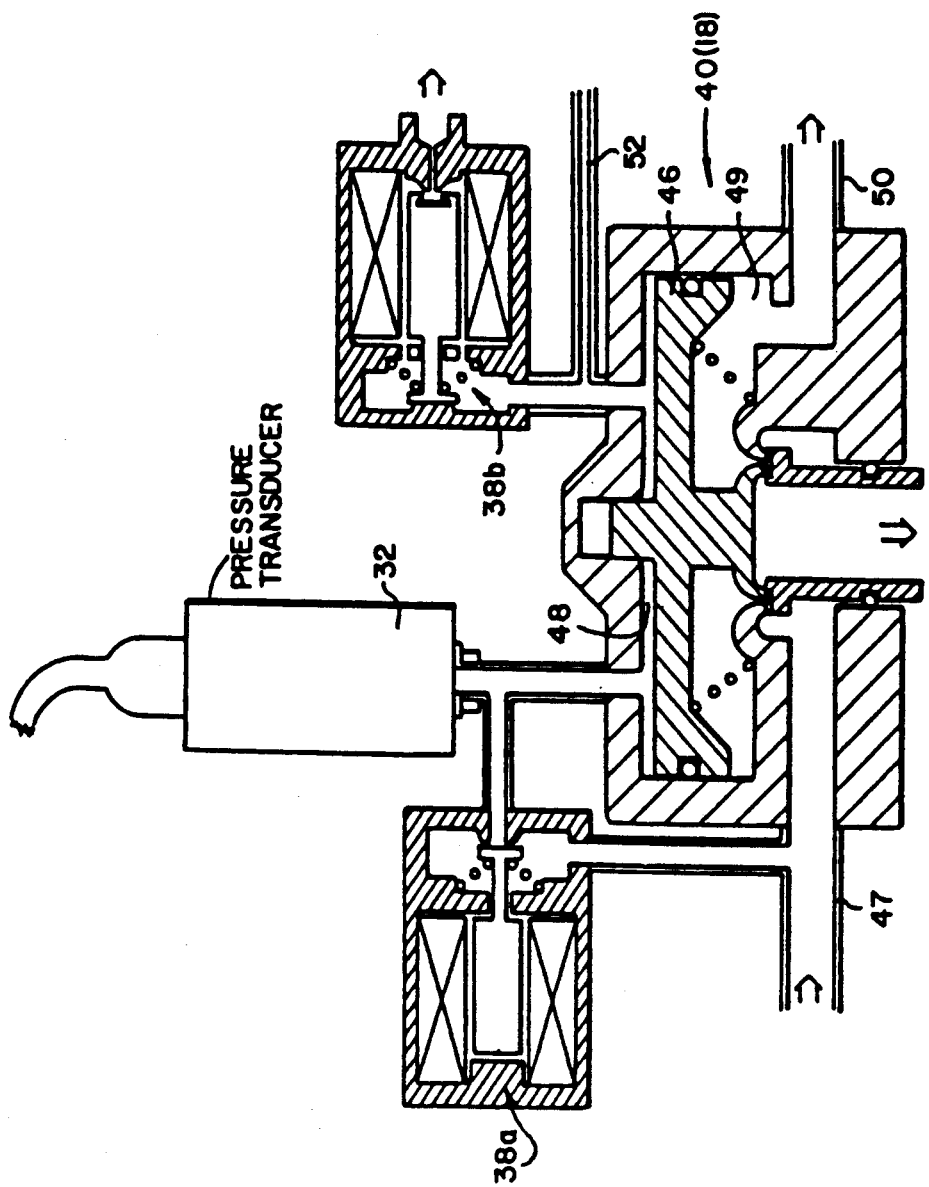
FIG. 2b shows a solenoid controlled relay valve as used in the present invention.

More detail of the preferred form of relay valve 40 is shown in FIG. 2b. The valve itself is conventional and has a piston 46 defining a control chamber 48 connected both to a high speed inlet solenoid valve 38a and a high speed outlet (exhaust) solenoid 38b and also to the pressure transducer 32. Air is supplied to the relay valve by an air supply line 47. The valve has an outlet control line 50 leading to the brakes. Displacement of the piston 46 downwardly (as viewed in FIG. 2b) causes air to be supplied from the reservoir 38 to the brakes via the main air supply line 47, a valve chamber 49 and the control line 50 in a conventional manner. Actuation of the (normally closed) solenoid valve 38a causes air to be introduced to the control chamber 48 to apply the brakes and actuation of the (normally open) solenoid valve 38b causes air to be vented from the control chamber 48 to release the brakes.

The pressure loops which give individual control on the front wheels of some vehicles have to be protected by the controller 12 under anti-lock operation to prevent the sudden appearance of large braking pressure differences between the front wheels since this can give rise to a serious steering disturbance whcih may lead to loss of control In this embodiment, in order to prevent failure conditions at one of the left or right braking channels causing the disturbance, the control chambers 48 of the relay valves 18a, 18b (40) are linked by a balance pipe 52 (see FIGS. 1 and 2b) designed to limit the pressure differential by allowing transfer of fluid from that one of the braking circuits which is at high pressure into the circuit which is still at low pressure. In the solenoid controlled relay valve of FIG. 2b, the preferred link pipe 52 is installed between the control chambers 48 of the two relay valves 18a,18b, thereby allowing this pipe 52 to have a small bore consistent with the small control chamber volumes involved.

To permit individual pressure control on the two brakes at opposite ends of any axle, the link pipe 52 is arranged to be blocked off during any anti-lock pressure cycles to prevent enforced "select low" operation, which would reduce the efficiency of adhesion utilisation on any split adhesion surface encountered. This is achieved by installing in the link pipe an isolating valve 54 (FIG. 1) which is operated by a solenoid 56 to close off the link 52 as the first skid cycle takes place on the first wheel to skid.

The diameter of the link pipe 52 is carefully selected so that in the event of a failure of one pressure control channel, pressure balance can be approximately achieved so that wide departures of braking pressures and therefore braking torques are prevented, but sufficient differential pressure still remains to cause the failure to be detected, with the isolating valve 54 open, by the controller 12 on the first stop of any significance. If the link isolator 54 is incorporated within the body of the electro-pneumatic relay valve itself, it may be advantageous in keeping to a single design, to have an isolator valve in each relay valve 18a,18b and to provide isolation at each end of the link pipe by energising both corresponding solenoids together. FIG. 1 shows a vehicle EBS layout with a single isolation valve 54 in the link pipe 52 on the front axle which is individually controlled at each wheel. If the vehicle being installed is very sensitive to differential rear braking, the individual wheel control of the rear axle could include a similar link pipe and isolating valve (not shown). Other embodiments of the present invention need not include the link pipe feature of FIG. 1.

If the fault monitoring means described hereinafter detect a channel fault, it is normal to continue operation of the axle pressure control means wherever possible and under these circumstances the balancing effect of the link pipe 52 is a valuable feature in assisting control of the vehicle. In such circumstances the normal isolating of the link pipe 52 during anti-lock operation will be arranged to be prevented and the "select low" operation of the axle (i.e. the adoption at both left and right channels of the control levels selected from that channel operating on that one of the left and right-hand wheels operating on a relatively low mu surface) will be selected in order to maintain vehicle stability.

Figure 3:
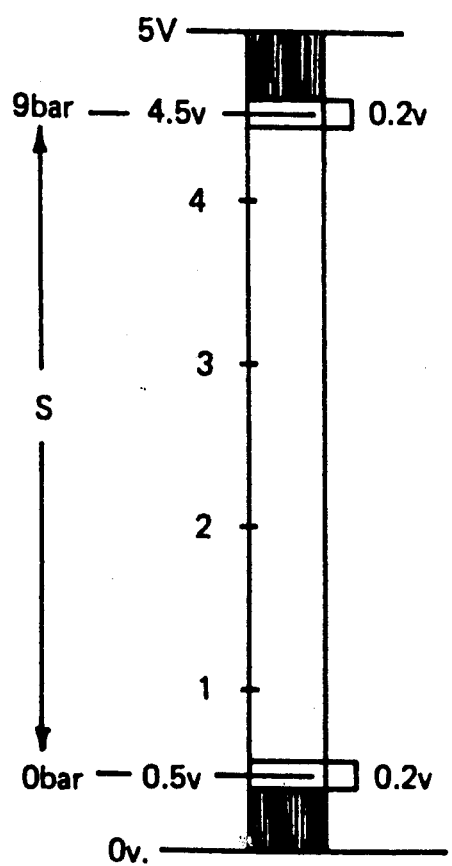
FIG. 3 illustrates the output range of a typical pressure transducer.

In the pressure control systems discussed above the relay control chamber pressure is measured by the pressure transducer 32 which forms the feedback element. This is preferably a high output sensor to avoid the transmission of low level signals down the vehicle which would be prone to interference. As illustrated in FIG. 3, the working voltage is typically arranged to have a 4 v span S and this is constrained to lie between 0.5 v and 4.5 v, although the output voltage which the sensor can generate will swing between 0 v and 5 v. The transducer zero point will be 0.5 v and full scale pressure level will never produce more than 4.5 v. Zero drift and span error extremes may extend the normal output voltage range to 0.4 v and 4.6 v so that between 0 v and 0.4 v and between 4.6 v and 5.0 v there exists two bands in which valid sensor outputs should never occur. The Controller measuring range of the controller 34 is arranged to cover 0 v to 0.5 v so that any voltage below 0.4 v or above 4.6 v is indicative of a sensor fault condition caused by excessive drift or a more serious malfunction.

Figure 4:
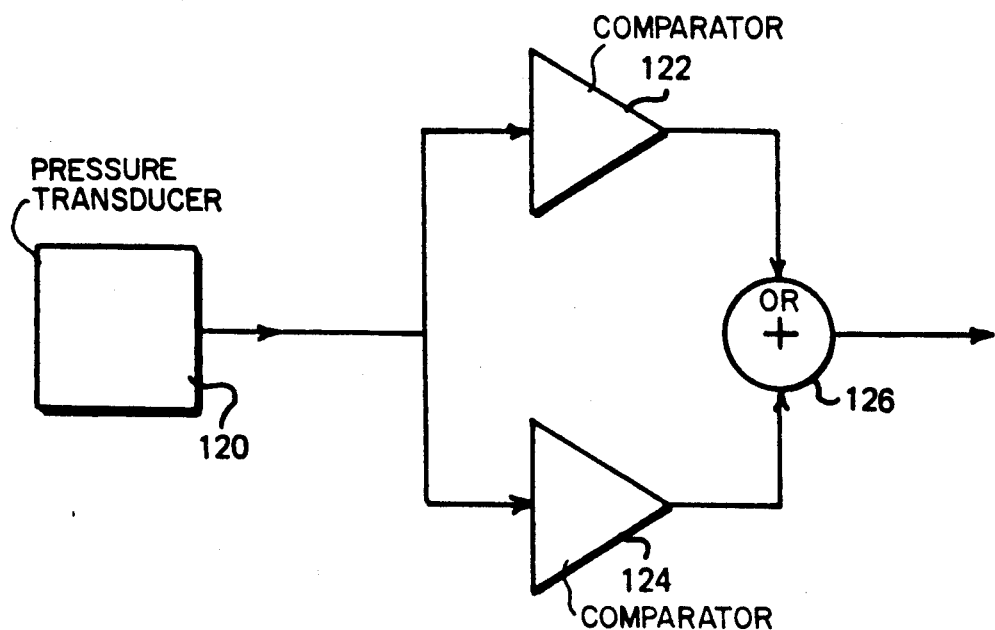
FIG. 4 is a circuit diagram of part of a system embodying the invention.

FIG. 4 shows a basic circuit of a means for detecting the occurrence of fault conditions in the transducer. The pressure transducer is indicated at 120, its output being input to two comparators 122,124. Comparator 122 is arranged to provide a high output to an OR gate 126 only if the output of the transducer 120 lies above 4.6 v. Comparator 124 provides a high output to the OR gate 126 only if the output of the transducer 120 lies below 0.4 v. A high signal level at either of its inputs produces a high level at the output of the OR gate 126 indicative of a fault condition in the transducer 120.

Figure 5:
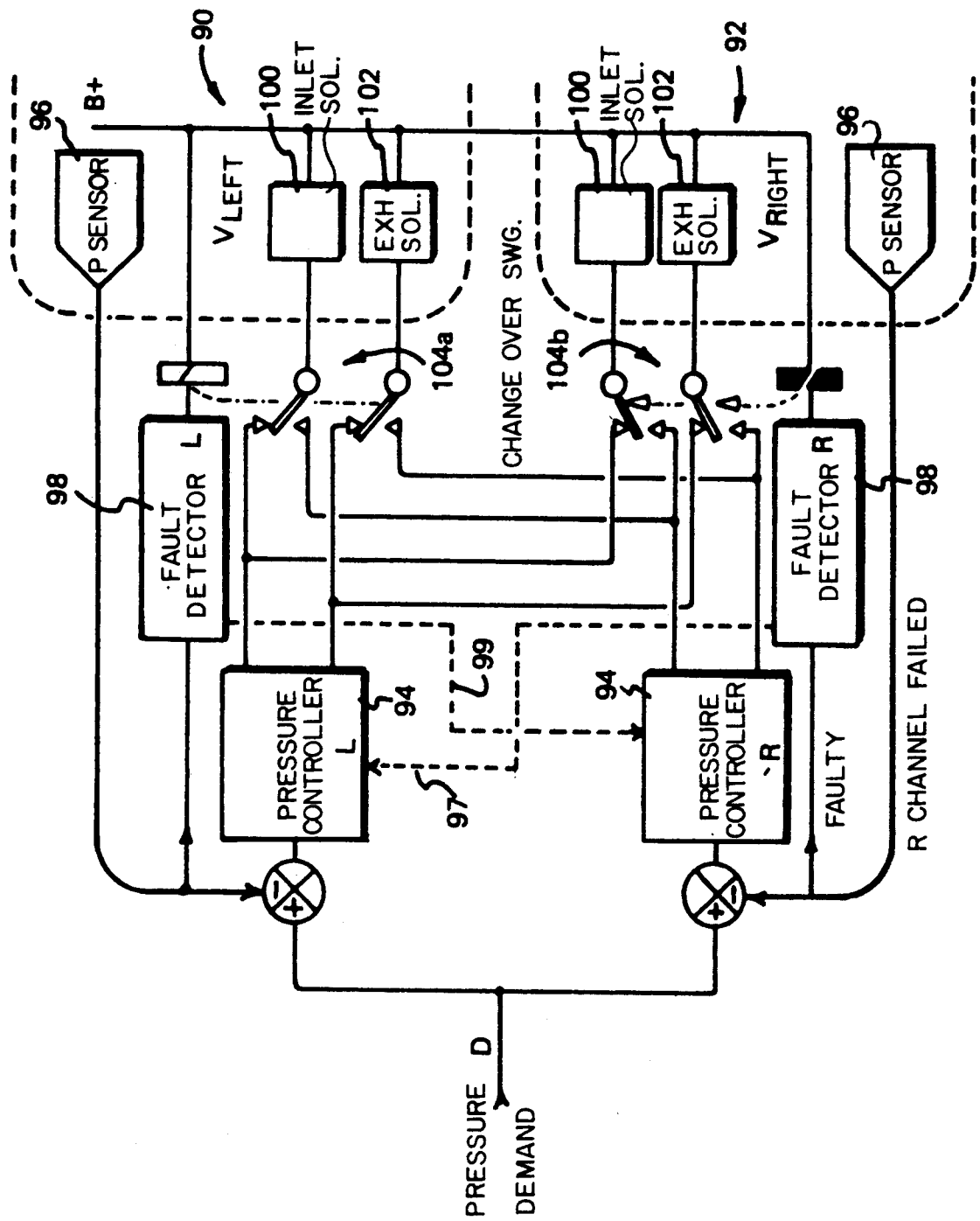
FIG. 5 illustrates the operation of a faulty channel as an open loop slave using control signals taken from a good channel.

The present system can be arranged so that detection of a pressure transducer fault, in a control scheme in which the two wheels on an axle have individually set braking pressures but are given common pressure demand signals, causes a switch in the control computer 12 to disconnect the loop which is faulty and drive the solenoid valves from the opposite channel signals i.e. the control loop which has a fully functional pressure transducer 32 as the feedback element. Thus, the resulting combination comprises one channel operated in closed loop from this local pressure feedback signal and the other channel operated as an open loop slave repeating the solenoid signals from the good channel. This arrangement is shown in FIG. 5 in block diagram form.

The pressure demand signal D is supplied to two identical circuits 90,92 corresponding to the left and right-hand brakes, respectively, of a given axle. Each circuit 90,92 includes a pressure controller 94 (corresponding to the pressure controller 34 of FIG. 2a), a pressure transducer 96, a fault detector 98, inlet solenoid valves 100 (corresponding to solenoid 38a of FIG. 2b) and exhaust solenoid valves 102 (corresponding to the solenoid 38b of FIG. 2b). Upon fault detection in one of the pressure transducers 96 by one of the fault detectors 98, respective changeover switches 104a,104b are actuated to switch over control of the inlet and exhaust solenoids associated with the faulty transducer 96 to the pressure controller of the circuit 90,92 which does not include a fault. FIG. 5 shows the condition where the right-hand channel contains a fault arising from a faulty signal from its transducer 96 and where the fault detector 98 for the right-hand channel is therefore actuated.

In some embodiments, under conditions of brake release, the failed channel can be arranged to receive longer, additional or semi-permanent pressure reduction signals to ensure a full return to zero pressure on the failed channel. A mechanism for achieving this is shown in chain-line in FIG. 5, where the fault detector 98 associated with the right-hand channel is connected by a line 97 to the pressure controller 94 of the left-hand channel and the fault detector 98 associated with the left-hand channel is connected by a line 99 to the pressure controller 98 associated with the right-hand channel. Faults detected by the fault detectors 98 generate signals in the associated lines 97, 99 which are passed to the pressure controller in the opposite channel to trigger the longer pressure signal in that channel. Valve responses are sufficiently repeatable to generate pressure which are in acceptable balance across the axle even without the link pipe feature, though of course with an open link pipe the pressure agreement is virtually faultless and such a link would never be isolated during the failed case described even if anti-lock operation was called for since this would be provided on a "select low" basis.

With the solenoid valve arrangement of FIG. 2b, the exhaust valve 38b is normally open and is energised to establish and hold pressure. Thus, at the end of a pressure cycling sequence when the brakes are fully released, the exhaust solenoid 38b is de-energised thereby allowing the control chamber 48 to exhaust and remain exhausted until the next brake application, thereby ensuring both left and right channels start at a zero pressure balance.

Figure 6:
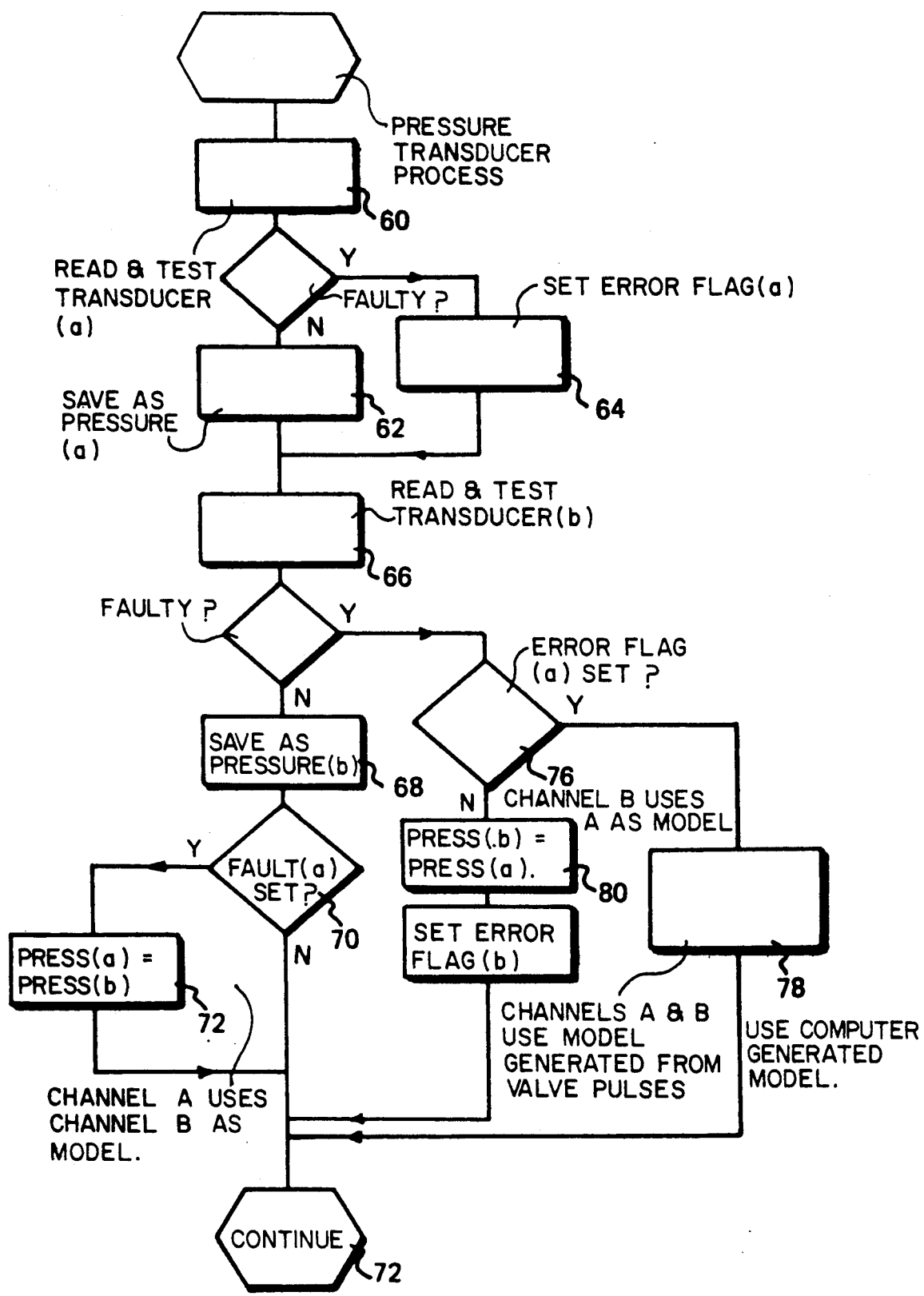
FIG. 6 is a flow chart showing the steps taken by a control computer to perform the control action changeover of FIG. 5.

A flow chart showing the basic steps taken by the control computer to perform the control action changeover of FIG. 5 is shown in FIG. 6.

The process begins by the first transducer 32 (transducer (a)) being read and tested (as described above) at 60. If the results of the test show that the reading is not faulty, then the result is saved at 62 as "pressure (a)". If the results of the test give a reading indicative of a fault condition, then an error flag (a) is set at 64. The second transducer 32 (transducer (b)) is then read at 66. If the reading shows no fault condition, then that reading is stored at 68 as "pressure (b)". If it is determined at 70 that flag (a) is not set, i.e. there is no fault condition at all, then the normal process proceeds at 72. However, if error flag (a) was present, then the system selects at 74 for pressure (a) to be made equal to pressure (b), i.e. the system uses channel A as a model for channel B. If the reading at 66 did show a fault condition, and it is determined at 76 that error flag (a) is still set then both channels are faulty and it is selected at 78 that both channels A and B should be operated using models generated from valve pulses, i.e. a computer generated model is used for both channels. If it is determined at 76 that channel B is faulty but channel A is normal then it is selected at 80 that pressure (b) be equal to pressure (a), i.e. channel B uses channel A as a model.

Under normal operation of the Electronic Braking System on an axle, where there is not anti-lock action because no skidding occurs at either wheel, the pressure demand signals are substantially equal and a comparison of the pressure transducer feedback signals will yield good agreement between wheel braking pressures. If such agreement does not occur, the differences are indicative of faulty valve or sensor operation and can be detected when greater than a preset level to annunciate a dynamic or steady state fault condition.

Thus, an arrangement can be included in which, for detecting of fault conditions in the individual channels, input signals to the two control channels on an axle are compared continuously under non anti-lock conditions and differential input levels are detected so that, other than for short transients, these form signals indicating faulty operation of one of the braking control channels on the axle. A basic circuit for achieving this operation is illustrated in FIG. 8 wherein the output signals from two pressure transducers 128a, 128b are compared in a comparator 130 which provides a high output level only if a difference in the signals from the transducer in excess of a preset level (e.g. 0.5 bar) is present. A high output from the comparator 130 can trigger a warning lamp 132 and a diagnostic output 134. A transient filter 136 prevents a warning being generated by short transients.

Fault conditions which are detected by pressure differential error are those associated with serious faults in the pressure sensor and which therefore result in a failure to respond to pressure changes or provide a serious response which causes problems with the control loop or, as is more likely, faults in the control valve responses which prevent control chamber pressure build-up or fall.

For example, an inlet solenoid valve (38a) failing to operate or being blocked by debris will generate a protracted pressure error which will rapidly be detected in comparison with the much lower or zero error of the opposite wheel channel which operates correctly and responds quickly to the demand signal. There will be an initial transient error which is converted into a serious static error if there is no pressure building up in the faulty channel. Even a partial blockage will generate a short pressure differential error indicating a slow response and would be detected as a fault which requires attention as soon as possible.

An exhaust valve (38b) which will not seat properly will present a continual leakage on the control chamber 48 and pressure build up will be consequently slowed, generating a transient pressure error as the first indication. However, this fault will produce a continuous pulsing of the inlet valve to restore control chamber pressure and this can be detected by comparison of the pressure as predicted by a model of the valve performance compared with the sensor pressure, as described hereinafter.

Figure 7:
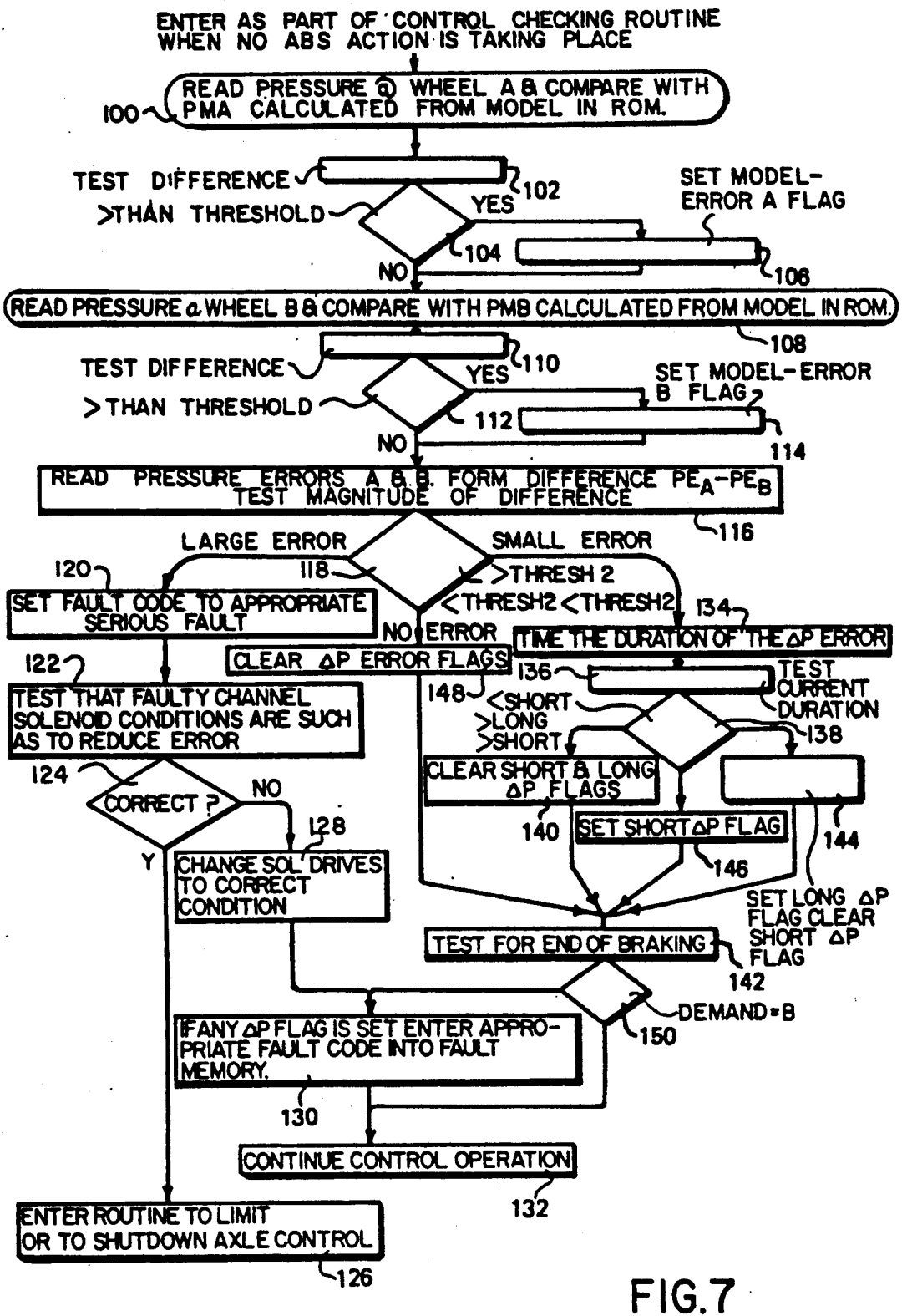
FIG. 7 is a flow chart of a differential error checking sequence.
Figure 9:
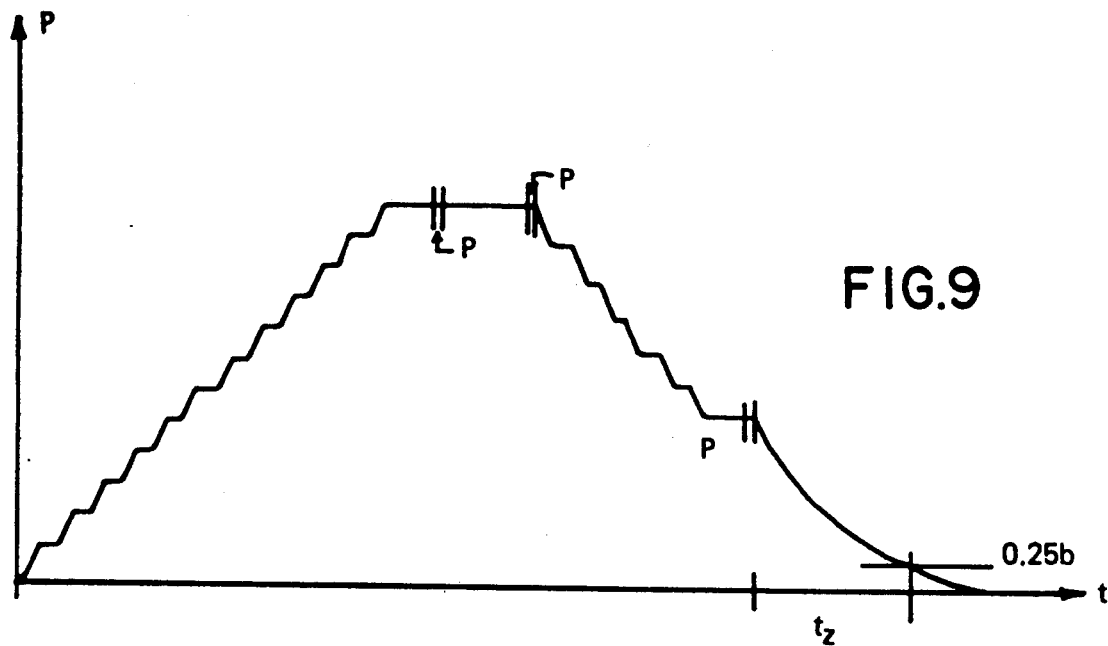
FIG. 9 is a diagram illustrating the formation of the pressure signals as a plurality of short pulses.

FIG. 7 shows a flowchart of the differential pressure errors detected as of short and long duration and static errors are detected if the differential pressure error is greater than a preset serious level, typically 2-2.5 bar, which merits special control action to prevent any further increase of differential braking pressures by holding down any further pressure rise at the correctly functioning channel or in an extreme condition by causing the axle system to be shut down.

The sequence of steps involved in the flow diagram of FIG. 7 is entered as part of a control checking routine when no ABS (anti-lock braking) action is taking place. The pressure at one wheel A is read at 100 and compared with PMA calculated from a predetermined model held in ROM. The difference between the measured pressure and calculated model pressure is tested at 102. If the difference is found at 104 to be greater than a pre-set threshold, then a MODEL-ERROR$_A$ flag is set at 106. The pressure at the other wheel B is then read at 108 and compared with PMB from the model held in ROM. The difference is tested at 110 and if found at 112 to be greater than a threshold, a MODEL-ERROR$_B$ flag is set at 114. The pressure errors A and B are read at 116 and the difference $P\epsilon_A - P\epsilon_B$ formed. The magnitude of the difference is tested at 118 against two thresholds I and II. If the difference is greater than threshold I then it is concluded that there is a larger error and the fault code is set at 120 to indicate SERIOUS FAULT. A test is then made at 122 that the faulty channel solenoid conditions are such as to reduce the error. If a "correct" answer is received at 124 than routine is entered at 126 to limit ΔP or to shutdown axle control altogether. If the answer at 124 is not correct then the drives to the inlet and exhaust solenoids are changed at 128 so as to give the correct condition. If then any ΔP flag is still set, then an appropriate fault code is entered into fault memory at 130 and control operation is continued at 132.

If at 118 the difference is less than threshold II it is concluded that there is only a small error. In this event, the duration of the ΔP error is timed at 134 and the prevailing duration tested at 136. If the test direction is found at 138 to be less than a short pre-set threshold value then the short and long ΔP flags are cleared at 140 and a test made at 142 for "end of braking". If the test duration measured at 136 is greater than a long pre-set threshold value then the long ΔP flag is cleared, before the test for end of braking at 142. If the test duration at 136 is greater than the short pre-set threshold value then the short ΔP flag is set at 146 before testing for end of braking at 142.

If at 118 the tested difference is less than threshold I, then it is concluded at 148 that there is no error and all ΔP error flags are cleared.

If, upon testing for "end of braking" at 142, it is found at 150 that the braking demand is zero, then if any ΔP flag is set then the appropriate fault code is entered at 130 into fault memory, and normal control operation is continued at 132.

Where braking demands are deliberately made unequal at the two wheel channels, to reflect, for example, different wheel loading levels caused by load distribution or by cornering, or to reflect an attempt at wear equalisation, the comparison can still be made after calculating an allowance factor based on the ratio of the two demand levels and multiplying the lowest pressure reading by this factor $$\text{e.g. } \frac{Dem\ Hi}{Dem\ Lo} = 1.2,$$

comparison which should be made.

When the power is turned on in a vehicle equipped with EBS, a test is made to ensure that the vehicle is stationary before a short trial application of the brakes is made with the line 52 isolated to ensure proper operation of the individual pressure control systems in both application and release phases. Where the application of vehicle brakes demands the charging of pressure reservoirs, the brake operation is modified into one of the following modes:

i. Brake application is made gradual and increase in demand is dependent on readings of control chamber pressure achieved. In this way the demand can be advanced just beyond the build up in brake reservoir pressure for each axle so that the test follows this build up in stored pressure until a pre-set limit value is reached, at which point the brakes are released.

ii. The trial brake application is deferred until the reservoirs are charged and the low pressure warning signals disappears. When this occurs, which would be available without delay for a power-on case with the reservoirs already charged, this test pulse of braking is applied to a pre-fixed demand level and, once achieved, the brakes are than released.

iii. A combination of i, and ii, whereby the brakes are applied and the rise of pressure is monitored in order to test the pressure sensors, if charging is awaited or taking place and, once a proper charge is established, the brakes are released and, after a short delay sufficient to allow a return to zero braking, the brakes are pulsed for the trial pressure period which is monitored and timed.

If mode i or iii is employed, the braking controller 12 is able to monitor the compressor or pump operation in charging the reservoir and can infer the condition of the charging elements from a timing measurement between two predetermined pressure levels.

For the trial application of the brakes, the pressure pulse is of a pre-set amplitude demand and pre-set duration so that the rise of relay valve control chamber pressure is expected to follow a predetermined trajectory in both rising and falling directions and timing measurements between pre-set levels provides two features:

i. The controller will be programmed to expect predetermined pressure rise and fall rates from correctly functioning pressure control systems. The actual pressure build-up and decay measurements are evaluated against the programmed expectation and any serious differences indicate a fault condition which can be announced before the vehicle starts off.

ii. Where differences exist between the controller model and actual value responses but are not serious, the measured timing parameters are stored and sued to update the internal model for use during normal braking operations on subsequent applications.

A preferred alternative to the single start up test pulse which tests the solenoid valve operate and release responses is to break the single energisation pulse into a series of short pulses, for example 12 pulses of 8.0 m.s. duration as shown in FIG. 12. The valve pressure is sampled approximately 16 m.s. after the end of these pulses and the pressure reading is stored as P sample 1a. P sample 1b is taken 64 m.s. later, which would be the same reading as P 1a as the pressure control has been in HOLD. After this reading, the exhaust valve is released in a second series of pulses, for example 6 pulses of 8.0 m.s. duration, after which the pressure control is put into hold and the pressure sample 2 is taken after 16 m.s. and then stored. The exhaust valve is opened to release the braking pressure and the time to fall to 0.25 bar is measured.

The short brake application generates P 1a, P 1b and P2 and a time t2 which are compared across the axle by forming the corresponding pressure differences and a time difference which should all be less then pre-set units which are programmed into the computer ROM. For each wheel, the absolute values of the 3 pressure and b 1 time reading should lie between predefined limits also programmed into the ROM.

If responses are correct, operation is allowed and the vehicle is clear to move off. If there is a serious failure such as no ON or OFF response, driver warning is given both audibly and visually and as one condition, such a serious fault is arranged to disable the vehicle to prevent it moving away from rest.

Figure 10:
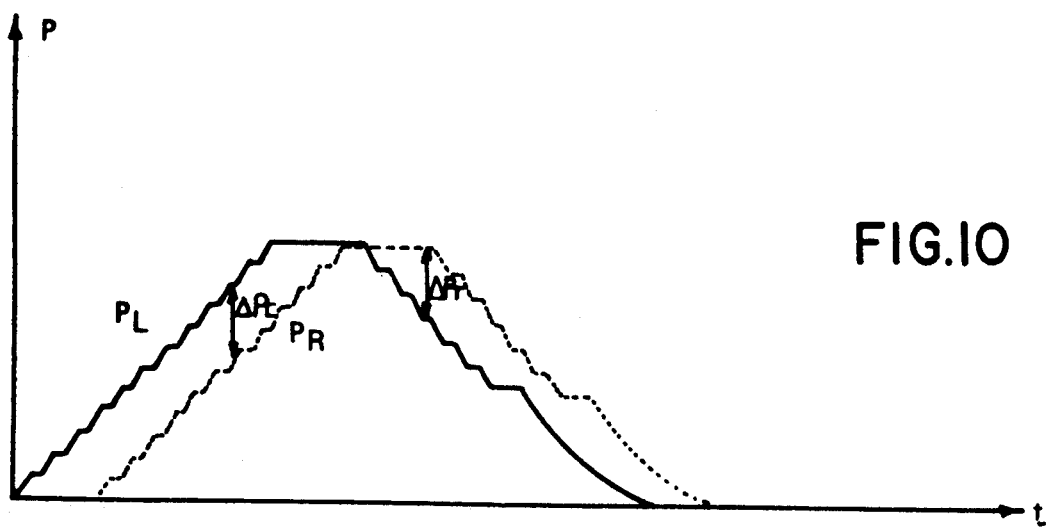
FIG. 10 is a diagram corresponding to FIG. 9 illustrating the staggering of the two braking pulses applied to each wheel.

For an axle controlled by an EBS system which employs the link pipe 52 connecting the two relay valve control chambers, this link pipe is closed by energising the isolating solenoid valve 54 during this braking pulse and by staggering the two baking pulses applied to each wheel. The effective isolation is checked by registering a known level or pressure differential $\Delta P_T$ as shown in FIG. 10 when the pressure is both rising and falling.

When normal braking action takes place in an EBS equipped vehicle, pressure demands are met by operation of the inlet and exhaust solenoids 38a, 38b of the relay valve. For a pressure rise for example, this may involve closing the exhaust valve and metering the admission of fluid in either a continuous opening or in a series of short pulses depending on the pressure error amplitude. During a pressure control phase, pressure is sampled at regular intervals and, from the model, the expected pressure change at the next sample can be calculated once the decision on the opening duration of the valve has been made. In addition to this prediction of the rising pressure at each sample, a longer term braking pressure is modelled from an integral of the solenoid valve signals with allowances being made for reduced pressure rise produced by short pulses and for reduced pressure increments being produced by all pulses at high established pressures. This modelling process extends to falling pressure also where the time periods of the exhaust solenoid are accumulated and a prediction of the point at which zero pressure should be reached is derived for comparison with actual zero pressure being reached. Serious disagreement between the predicted and actual pressures is an indicator of faulty operation of the pressure control loop with the fault associated with the control solenoid valves, piping or component leaks or with a faulty pressure transducer which has failed in such a way that limit voltage swings are not detected. The extent of the fault will indicate the seriousness of the condition encountered and indicate probable causes, e.g. slow response may indicate a partial blockage of valve parts or exhaust leakage whereas no response at all indicates a jammed valve in total port blockage since the electrical circuit will be checked continuously as is currently the standard with EBS solenoid valves.

Thus, the system can include a control means for automatically applying a braking pulse at vehicle startup, provided that the vehicle is not in motion or that braking is not being demanded by the driver. Just prior to this pulse being instituted, a test is made to ensure that braking energy reservoirs for the pressure adjustment channels are adequately charged. During and after this braking demand pulse, the inlet and exhaust operations of the pressure control valves are monitored in that the pressure rise and fall at each wheel control channel is measured against time and compared with a pre-stored reference response model, clear differences being taken as indicating a fault condition.

Figure 13:
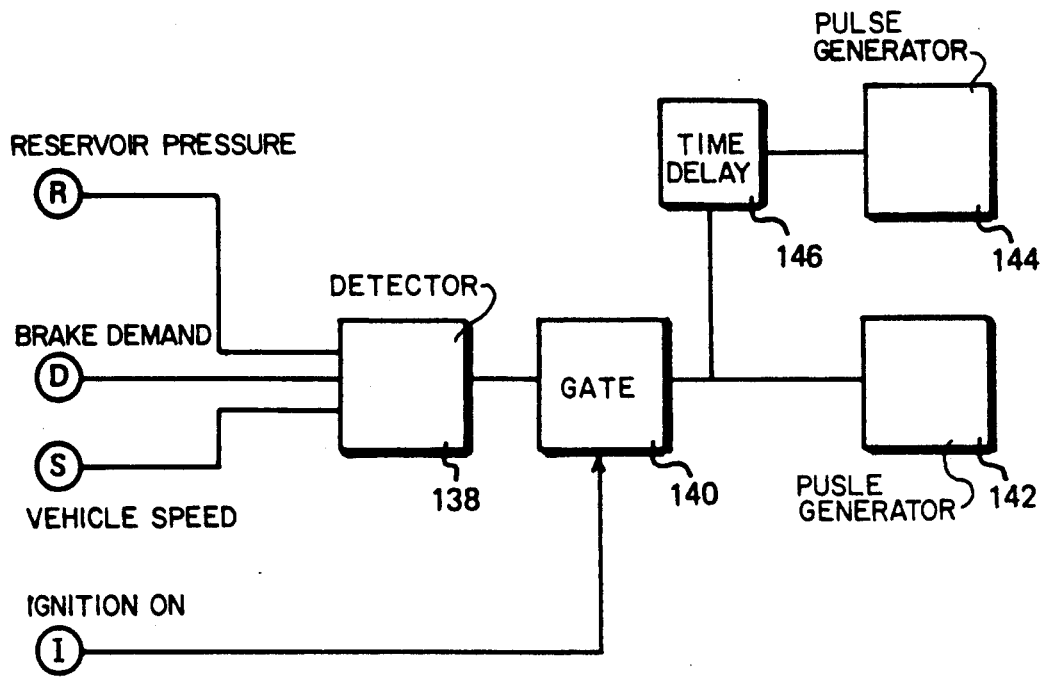
FIGS. 13 and 14 are circuit diagrams of still further parts of embodiments of the invention.

Such a system is illustrated in FIGS. 11, 12, 13 and 14. FIG. 13 illustrates the detection of the conditions necessary for generation of a startup pulse. Reservoir pressures, brake demand level, vehicle speed and ignition ON signals are applied to inputs R, D, S and I respectively. A high output level is delivered by detector 138 only if the vehicle speed S is zero, the brake demand D is zero and the reservoir pressure R is at a maximum. Provided the ignition switch is switched ON and signal I is present, a gate 140 passes the high level signal to a first pulse generator 142 directly and also to a second pulse generator 144 via a time delay 146.

Referring now to FIGS. 11 and 12, FIG. 11 shows the generation of a series of pulses $S_1$ for operating the inlet solenoid 38a (see FIG. 26) of the relay valve 40 and the generation of a series of pulses $S_2$ for operating the exhaust solenoid 38b. The references 1a, 1b, 2, 3, 4a, 4b, 5 and 6 identify sampling points at which the pressure values are sampled for comparing with specified stored values retained in the stored model of the valve and considered acceptable at that sample point. The valve is considered faulty if the measured value deviates significantly from these values. FIG. 12 shows the generation of corresponding pulses $S_3$ and $S_4$ for the pressure transducer of the other channel on an axle. The time delay t between initial actuation of the two inlet solenoids will be noted.

Figure 14:
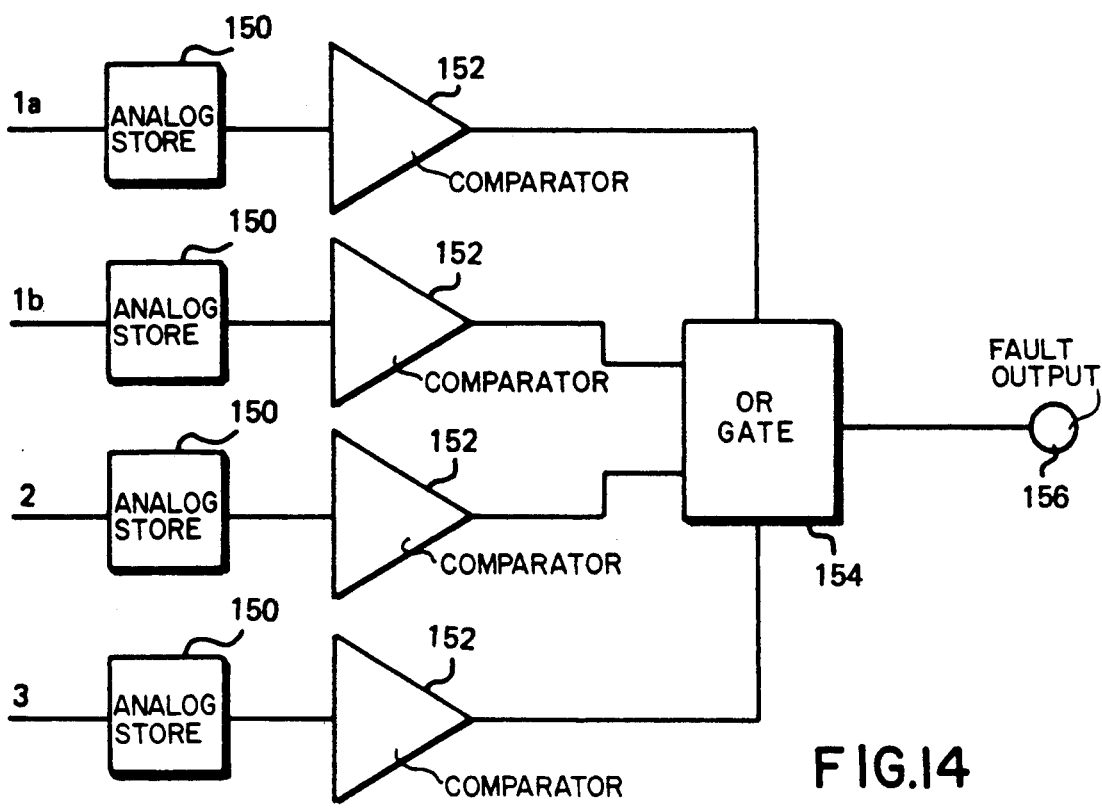

FIG. 14 shows a basic circuit for comparing the sampled pressure values with those from the pre-stored model. Samples 1a, 1b, 2, 3 are introduced to analogue stores 150 and then to respective comparators 152 whose outputs only become high when the input lies outside predetermined limits established by the model. The comparator outputs are passed to an OR gate 154 so that a fault output at 156 is only obtained if any of the samples disagree significantly with the stored model values.

We claim:

1. In a vehicle dual wheel braking system in which a respective electronically controlled pressure adjustment channel is provided for each of the wheels at the opposite ends of an axle of the vehicle for setting the braking pressures individually for each wheel in dependence upon a common electrical signal representative of the braking demand level set by a driver of the vehicle, each channel comprising a pressure control loop containing a pressure controller, a pressure control valve which adjusts the supply of fluid from a reservoir to the brake actuators for applying and releasing the brakes by solenoid control of the inlet and exhaust functions of the pressure control valve, and a feedback transducer which supplies a signal representative of the control pressure in the pressure control valve, the improvement comprising respective fault monitoring means for detecting the presence of faults in the signals provided by the two feedback transducers, and means responsive to said fault monitoring means such that if a feedback signal fault is detected in one of said two channels the individual pressure control on that channel is disabled and the solenoids controlling inlet and exhaust functions of the pressure control valve of that channel are energised from an alternative mechanism of control which does not rely upon the output signal from the faulty feedback transducer.

2. A braking system according to claim 1, wherein, in the event of a fault condition being detected in the feedback signals of one of the two channels, and the individual pressure control on that channel being disabled, the solenoids controlling inlet and exhaust functions of the pressure control valve of that channel are energised from corresponding signals occurring in the other pressure control loop at the opposite wheel.

3. A braking system according to claim 2, in which the failed channel which receives cross solenoid signals, under conditions of brake release, is arranged to receive longer pressure reduction signals to ensure a full return to zero pressure on the failed channel.

4. In a vehicle dual wheel braking system in which a negative electronically controlled pressure adjustment channel is provided for each of the wheels at opposite ends of an axle of the vehicle for setting the braking pressures individually for each wheel in dependence upon a common electrical signal representative of the braking demand level set by a driver of the vehicle, each channel comprising a pressure control loop containing a pressure controller, a pressure control valve which adjusts the supply of fluid from a reservoir to the brake actuators for applying and releasing the brakes by solenoid control of the inlet and exhaust functions of the pressure control valve, and a feedback transducer which supplies a signal representative of the pressure in the pressure control valve, the improvement comprising respective fault monitoring means for detecting the presence of faults in the signals provided by the two feedback transducers;

means responsive to said fault monitoring means such that if a feedback signal fault is detected in one of said two channels, the individual pressure control on that channel is disabled and the solenoids controlling inlet and exhaust functions of the pressure control valve of that channel are energised from an alternative mechanism of control which does not relay upon the output signal from the faulty feedback transducer;

the feedback transducers, which supply signals representative of the control pressure in the pressure control valves of the two control loops, each comprising a pressure transducer, the output signal of which is constructed to operate within a defined signal band which does not extend up to the limits of possible operation of the pressure transducer so that there exists two small extreme signal bands outside the normal operating band of the transducer which will only be entered in the event of a fault condition within that sensor, there being provided a selective detection device which is adapted to recognise any excursion of the transducer output signals into the extreme bands and thereupon to issue a fault signal which is detected by the respective fault monitoring means to trigger disablement of the loop containing the faulting transducer and to arrange for energisation of the inlet and exhaust functions of the pressure control valve in that loop to be achieved by said alternative mechanism of control which does not rely upon the output signal from the faulty feedback transducer.

5. A braking system according to claim 4, wherein, in the event of a fault condition being detected in the feedback signals of one of the two channels, and the individual pressure control on that channel being disabled, the solenoids controlling inlet and exhaust functions of the pressure control valve of that channel are energised from corresponding signals occurring in the other pressure control loop at the opposite wheel.

6. A braking system according to claim 5, in which the failed channel which receives cross solenoid signals, under conditions of brake release, is arranged to receive longer pressure reduction signals to ensure a full return to zero pressure on the failed channel.

7. In a vehicle dual wheel braking system in which a respective electronically controlled pressure adjustment channel is provided for each of the wheels at the opposite ends of an axle of the vehicle for setting the braking pressures individually for each wheel in dependence upon a common electrical signal representative of the braking demand level set by a driver of the vehicle, each channel comprising a pressure control loop containing a pressure controller, a pressure control valve which adjusts the supply of fluid from a reservoir to the brake actuators for applying and releasing the brakes by solenoid control of the inlet and exhaust functions of the pressure control valve, and a feedback transducer which supplies a signal representative of the control pressure in the pressure control valve, the improvement comprising respective fault monitoring means for detecting the presence of faults in the signals provided by the two feedback transducers;

means responsive to said fault monitoring means such that if a feedback signal fault is detected in one of said two channels, the individual pressure control on that channel is disabled and the solenoids controlling inlet and exhaust functions of the pressure control valve of that channel are energised from an alternative mechanism of control which does not rely upon the output signal from the faulty feedback transducer;

means for comparing input signals to the two control channels on an axle continuously under non antilock conditions, and means for detecting differential input levels so that, other than for short transients, these form signals indicating faulty operation of one of the braking control channels on the axle.

8. In a vehicle dual wheel braking system in which a respective electronically controlled pressure adjustment channel is provided for each of the wheels at the opposite ends of an axle of the vehicle for setting the braking pressures individually for each wheel in dependence upon a common electrical signal representative of the braking demand level set by a driver of the vehicle, each channel comprising a pressure control loop containing a pressure controller, a pressure control valve which adjusts the supply of fluid from a reservoir to the brake actuators for applying and releasing the brakes by solenoid control of the inlet and exhaust functions of the pressure control valve, and a feedback transducer which supplies a signal representative of the control pressure in the pressure control valve, the improvement comprising respective fault monitoring means for detecting the presence of faults in the signals provided by the two feedback transducers;

means responsive to said fault monitoring means such that if a feedback signal fault is detected in one of said two channels the individual pressure control on that channel is disabled and the solenoids controlling inlet and exhaust functions of the pressure control valve of that channel are energised from an alternative mechanism of control which does not rely upon the output signal from the faulty feedback transducer; and link pipe means connecting the pressure control valves of the respective brake circuits associated with the two wheels at opposite ends of an axle whereby the pressure control valves are influenced in such a manner that a correctly functioning channel attempts to influence a faulty channel in such a direction as to reduce the pressure unbalance.

9. A braking system according to claim 8, in which said link pipe means, installed to prevent substantial braking input differences between the wheels on an axle, is arranged to provide a specially selected restriction such that pressure control valve failure will generate a detectable difference in braking input when a failure exists at one of the braking control channels.

10. In a vehicle dual wheel braking system in which a respective electronically controlled pressure adjustment channel is provided for each of the wheels at the opposite ends of an axle of the vehicle for setting the braking pressures individually for each wheel in dependence upon a common electrical signal representative of the braking demand level set by a driver of the vehicle, each channel comprising a pressure control loop containing a pressure controller, a pressure control valve which adjusts the supply of fluid from a reservoir to the brake actuators for applying and releasing the brakes by solenoid control of the inlet and exhaust functions of the pressure control valve, and a feedback transducer which supplies a signal representative of the control pressure in the pressure control valve, the improvement comprising respective fault monitoring means for detecting the presence of faults in the signals provided by the two feedback transducers;

means responsive to said fault monitoring means such that if a feedback signal fault is detected in one of said two channels, the individual pressure control on that channel is disabled and the solenoids controlling inlet and exhaust functions of the pressure control value of that channel are energised from an alternative mechanism of control which does not rely upon the output signal from the faulty feedback transducer;

a control means for automatically applying a braking pulse at vehicle start-up, provided that the vehicle is not in motion and that braking is not being demanded by the driver; and means for making a test, just prior to the latter pulse being instituted, to ensure that braking energy reservoirs for the pressure adjustment channels are adequately charged and that during and after this braking demand pulse, the inlet and exhaust operations of the pressure control valves are monitored in that the pressure rise and fall at each wheel control channel is measured against time and compared with a pre-stored reference response model, wherein clear differences are taken as indicating a fault condition.

11. A braking system according to claim 10, in which brake pressure rise and fall factors for each control channel are stored and a control computer forms an internal model which predicts the pressure changes resulting from periods of energisation of the pressure control valve solenoids and this figure is compared with actual changes in pressure measured at each channel by the local feedback transducer, clear differences between predicted and actual pressure changes being taken to indicate a channel fault condition.

12. A braking system according to claim 11, in which the computer model of valve responses integrates the opening times of the inlet valve and release times of the exhaust valve and allows for reduced pressure change resulting from short pulses, in pressure rise at high pressure and pressure fall at low pressure, to predict through integration of model inputs both pressure change $\Delta P$ on the next opening and total pressure, and signals a fault condition where actual pressure does not agree with predicted pressure.

13. A braking system according to claim 10, including link pipe means connecting the pressure control valves of the respective brake circuits associated with the two wheels at opposite ends of an axle whereby the pressure control valves are influenced in such a manner that a correctly functioning channel attempts to influence a faulty channel in such a direction as to reduce the pressure unbalance.

14. A braking system according to claim 13, in which said link pipe must be closed during said brake pulse test and to establish that this condition is obtained the brake pulse test is staggered in time between the two channels so that a measured pressure difference shows that the two channels are correctly isolated.

15. In a vehicle dual wheel braking system in which a respective electronically controlled pressure adjustment channel is provided for each of the wheels at the opposite ends of an axle of the vehicle for setting the brake pressures individually for each wheel in dependence upon a common electrical signal representative of the braking demand level set by a driver of the vehicle, each channel comprising a pressure control loop containing a pressure controller, a solenoid controlled relay valve which adjusts the supply of fluid from a reservoir to the brake actuators for applying and releasing the brakes by solenoid control of the inlet and exhaust functions of the relay valve, and a feedback transducer which supplies a signal representative of the pressure in the relay valve, the improvement comprising respective fault monitoring means for detecting the presence of faults in the signals provided by the two feedback transducers, and means responsive to said fault monitoring means such that if a feedback signal fault is detected in one of said two channels, the individual pressure control on that channel is disabled and the solenoids controlling inlet and exhaust functions of the relay valve of that channel are energised from an alternative mechanism of control which does not rely upon the output signal from the faulty feedback transducer.

* * * * *